(12) United States Patent
Seyffert et al.

(10) Patent No.: US 8,950,781 B2
(45) Date of Patent: Feb. 10, 2015

(54) BELT PRESENTER

(75) Inventors: Martin Seyffert, Pfullingen (DE); Karl Birk, Ebersbach (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 14/342,801

(22) PCT Filed: Sep. 10, 2012

(86) PCT No.: PCT/EP2012/003782
§ 371 (c)(1),
(2), (4) Date: Mar. 5, 2014

(87) PCT Pub. No.: WO2013/037470
PCT Pub. Date: Mar. 21, 2013

(65) Prior Publication Data
US 2014/0252840 A1 Sep. 11, 2014

(30) Foreign Application Priority Data
Sep. 12, 2011 (DE) .......................... 10 2011 112 834

(51) Int. Cl.
*B60R 22/03* (2006.01)
*B60R 22/20* (2006.01)
*B60R 22/24* (2006.01)
*B60R 22/18* (2006.01)

(52) U.S. Cl.
CPC ................ *B60R 22/03* (2013.01); *B60R 22/24* (2013.01); *B60R 2022/1818* (2013.01); *B60R 22/201* (2013.01); *B60R 2022/208* (2013.01)
USPC ....................................... 280/801.1; 297/481

(58) Field of Classification Search
CPC B60R 22/03; B60R 22/201; B60R 2022/208; B60R 2022/1818; B60R 22/24
USPC ................ 280/801.1, 808; 297/481, 468, 483
See application file for complete search history.

(56) References Cited

U.S. PATENT DOCUMENTS

| | | | | |
|---|---|---|---|---|
| 4,033,594 A * | 7/1977 | Lindblad | ........................ | 297/481 |
| 4,667,982 A * | 5/1987 | Volk et al. | ...................... | 280/808 |
| 4,832,366 A * | 5/1989 | Corbett et al. | ................ | 280/808 |
| 5,044,459 A * | 9/1991 | Nishikaji | ....................... | 180/268 |
| 5,176,402 A * | 1/1993 | Coulon | ........................... | 280/807 |
| 6,705,645 B2 * | 3/2004 | Motozawa et al. | ............ | 280/806 |
| 8,678,438 B2 * | 3/2014 | You et al. | ................... | 280/801.2 |
| 2008/0018088 A1 * | 1/2008 | Gray | .............................. | 280/808 |
| 2009/0127840 A1 | 5/2009 | Freisleben et al. | | |
| 2012/0217787 A1 * | 8/2012 | Adolfsson et al. | ............ | 297/480 |

(Continued)

FOREIGN PATENT DOCUMENTS

| | | |
|---|---|---|
| DE | 195 44 589 | 6/1997 |
| DE | 10 2005 059 453 | 6/2007 |

(Continued)

*Primary Examiner* — Karen Beck
(74) *Attorney, Agent, or Firm* — Tarolli, Sundheim, Covell & Tummino LLP

(57) ABSTRACT

A belt presenter for a seat belt system of a vehicle includes an arm (22) which is pivotal in a state mounted on the vehicle, wherein the arm (22) can adopt a feeding position (A) and a parking position (P). The arm (22) includes a finger (44) for seizing the strap (20) when the arm moves into the feeding position (A), and the finger (44) is pivoted at the arm (22) so that it can adopt a folded position in which it is located substantially in parallel to the arm (22) and an unfolded position in which the finger (44) is orientated substantially perpendicularly to a pivoting plane of the arm (22).

20 Claims, 21 Drawing Sheets

(56) References Cited

U.S. PATENT DOCUMENTS

2013/0069356 A1* 3/2013 You et al. .................. 280/801.1
2014/0175780 A1* 6/2014 Birk et al. .................. 280/801.2
2014/0252840 A1* 9/2014 Seyffert et al. ............... 297/468

FOREIGN PATENT DOCUMENTS

DE 10 2006 008 930 8/2007
DE 10 2008 020 911 10/2009

* cited by examiner

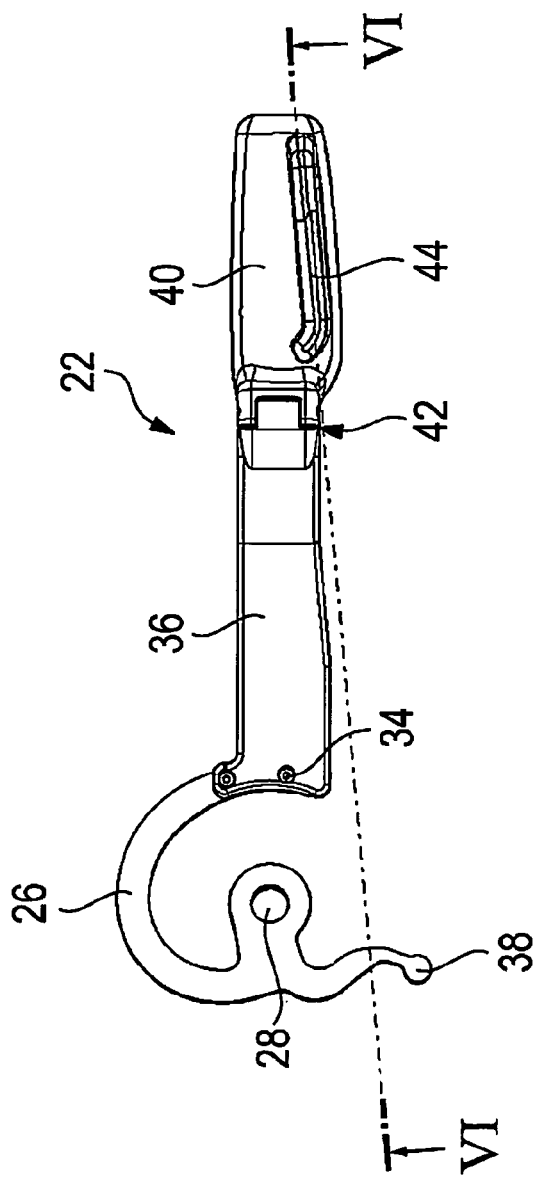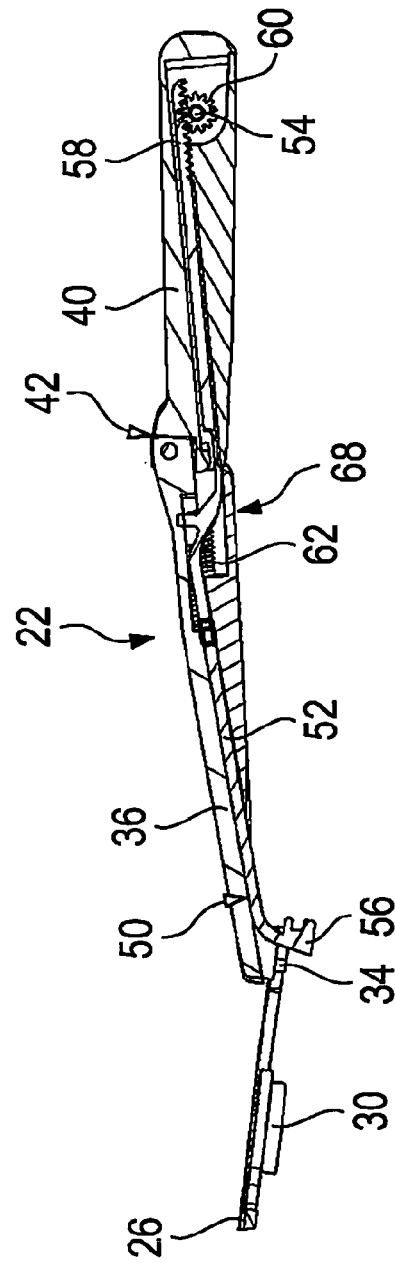
FIG. 5
FIG. 6 ing position. The arm itself can be configured to be appropriately narrow and arranged closely to the B-pillar lining. When the belt presenter is not required, i.e. when the vehicle is running, the finger is in the folded position where it does not protrude at all or not much from the arm.

BELT PRESENTER

RELATED APPLICATIONS

This application corresponds to PCT/EP2012/003782, filed Sep. 10, 2012, which claims the benefit of German Application No. 10 2011 112 834.8, filed Sep. 12, 2011, the subject matter, of which are incorporated herein by reference in their entirety.

BACKGROUND OF THE INVENTION

The invention relates to a belt presenter for a seat belt system of a vehicle.

Belt presenters that, while a vehicle occupant gets into the car, bring a portion of the seat belt into a feeding position in which it can be easily seized by the occupant are known primarily in two-door vehicles such as coupes or convertibles in which the deflection fittings at the B-pillar are distant from the front seats. It is desired, however, to offer this comfort to the occupants also in four-door or five-door vehicles. But it is a problem that in those vehicles the B-pillar is definitely narrower than in two-door vehicles and a linear displacing mechanism used in those vehicles cannot be employed for reasons of space. In order to be able to make better use of the restricted space, the belt presenter can be arranged e.g. at a height adjuster of the seat belt system, especially at the slide thereof. The belt presenter then is moved along with the height adjuster and no separate space must be provided for the belt presenter at the B-pillar.

SUMMARY OF THE INVENTION

It is the object of the invention to design a belt presenter so that despite its position at the vehicle pillar the belt presenter is visually little disturbing and does not impede any safety systems provided.

This is achieved with a belt presenter for a seat belt system of a vehicle in that the belt presenter comprises an arm pivoted to the vehicle pillar in the state mounted on the vehicle, the arm being adapted to adopt a feeding position and a parking position. The arm includes a finger for seizing the belt strap when the arm moves to the feeding position and the finger is pivoted to the arm so that it can adopt a folded position in which it is substantially in parallel to the arm and an unfolded position in which the finger is substantially orientated perpendicularly to a pivot plane of the arm. The finger protruding into the vehicle interior in the unfolded position seizes the strap during the pivoting movement of the arm and moves it to the feeding position. The arm itself can be configured to be appropriately narrow and arranged closely to the B-pillar lining. When the belt presenter is not required, i.e. when the vehicle is running, the finger is in the folded position where it does not protrude at all or not much from the arm.

The pivoting plane in this case is understood to be the plane swept by the arm from the parking position to the feeding position which is substantially parallel to the vehicle side wall (while disregarding the curvature of the B-pillar lining and the vehicle inside as well as a possible curvature of the arm).

The arm is preferably pivoted to a height adjuster for the seat belt mounted on the vehicle pillar.

Preferably the arm is located closely to the lining of the B-pillar (in the parking position it is usually aligned in parallel thereto), where it is visually unobtrusive. Due to this arrangement the possible deployment of a thorax or head airbag for example out of the back rest of a front vehicle seat is not impeded, either, because the space between the seat rest and the door inside and the B-pillar lining is substantially free.

The finger is preferably fastened to an end portion of the arm so that a maximum swivel path is resulting with an as short arm as possible.

In the unfolded position the finger is preferably disposed approximately at an angle of 90° with respect to the pivot plane and to the longitudinal extension of the arm and substantially perpendicularly to the end portion.

Preferably the finger is provided in the unfolded position during the entire pivoting movement of the arm.

On the whole the arm can be slightly curved so as to be capable, on the one hand, of better contacting the B-pillar lining in the parking position and, on the other hand, of protruding further into the vehicle interior by its shape in the feeding position. For reasons of illustration this curvature is left aside in the discussion of the invention.

In the parking position the arm is located preferably in parallel to the B-pillar and the lining thereof, while in the feeding position it can be swiveled out by approx. 65° vis-à-vis the B-pillar.

In the parking position the finger is advantageously provided in the folded position so as to reduce the space required for the belt presenter. However, in the feeding position the finger is advantageously provided in the unfolded position so as to present the belt strap to the occupant.

In a preferred embodiment of the invention, the arm has a link portion fastened to the height adjuster in the state mounted on the vehicle advantageously such that the fastening forms a pivot point about which the entire arm can be pivoted. The link portion is fixed, for example, at deflection fittings fastened to the slide of the height adjuster or at the link point thereof.

Of preference, at the link portion a first element of attack is provided which is communicated with a drive of the belt presenter and is movable by the same. The element of attack can be realized e.g. by a bracket projecting from the link portion. In this way a linear movement of the element of attack can be easily converted to a swivel movement of the link portion and thus of the entire arm. For this purpose, the link portion is only required to be arranged at a radial distance from the link point of the link portion.

Advantageously, a motion mechanism for moving the finger is provided at the arm, the mechanism including a second element of attack which is communicated with a drive of the belt presenter and can be actuated by the latter. Unfolding and/or folding of the finger can equally be carried out by the drive of the belt presenter.

The motion mechanism can include a transmission element, for example, having a gearing that is in mesh with a gearing at the finger. The relative movement of the gearings permits controlled unfolding and folding of the finger.

It is possible to carry out only either of the movements (unfolding or folding) of the finger by the drive, while the reverse movement is triggered by a return spring.

Preferably the transmission element includes the second element of attack at the drive-side end so that the drive can act directly on the transmission element.

The drive preferably includes a linearly movable drive element which engages in the first and/or second element of attack when the arm and/or the finger is moved. The drive can be, for instance, a spindle drive having a linearly moved spindle. In this way the linear movement of both the first and the second element of attack is available for moving the arm, on the one hand, and the transmission element, on the other hand. Hence by the same linear movement of the drive two movements can be controlled independently of each other, i.e. the movement of the arm and the movement of the finger.

The drive element can be formed, for example, so that idling is provided between the movement of the second and first elements of attack. This permits time-shifted control of the movement of the arm and the finger. Idling can be realized, for example, by a play between the first element of attack and the drive element or by spring travel at the end of the adjusting movement of the first element of attack.

It is possible, for example, during movement of the arm from the parking position into the feeding position to first actuate the second element of attack for moving the finger and subsequently the first element of attack for moving the arm and vice versa upon pivoting the arm out of the feeding position into the parking position to first move the first element of attack and thus the arm and, only when the arm has taken the parking position, to move the second element of attack and to displace the finger into the folded position.

In a possible embodiment an end portion of the arm is connected via a hinge to the residual arm so that the end portion is pivoting vis-à-vis the residual arm perpendicularly to the longitudinal extension and perpendicularly to the pivoting plane of the arm. In this embodiment the end portion of the arm can move, for example, in the parking position against the B-pillar, i.e. away from the vehicle interior, and in this way can further minimize the space required by the belt presenter.

Moreover, a mechanism can be provided for rotating the arm during pivoting about the longitudinal axis thereof. In this way another degree of freedom can be added to the pivoting movement. The rotation of the arm can be advantageously used to travel the unfolded finger from a position in which the strap can be properly seized during the feeding movement along a curve by which the vehicle occupant is hindered as little as possible. Moreover it is possible to orientate the finger axis obliquely to the vehicle axis by pivoting the finger upon rotating the arm about its longitudinal axis and to virtually clamp the seized strap which reduces feeding failures.

It is possible to perform a first rotation in a first direction at the beginning or shortly after the beginning of the pivoting operation of the arm and to perform one or more further rotations in the same direction or in an opposite direction at later points in time, especially toward the end of the pivoting operation of the arm.

Rotation of the arm about its longitudinal axis can be easily achieved, for example, in that a means of attack, preferably at the arm, and a guide preferably fixed to the vehicle are provided, wherein the arm is rotated by the guide acting on the means of attack during the pivoting movement of the arm.

According to a first preferred embodiment, the means of attack is formed by a gearwheel and the guide is formed by a segment gear engaged in the gearwheel which can be in the form of e.g. a circular-arc rack. Advantageously the gearwheel is arranged at the arm and the segment gear is arranged to be fixed at the vehicle. However, as a matter of course it is also possible to reverse this arrangement. When the gearwheel engages in the segment gear, this entails rotation of the gearwheel and, when the gearwheel is tightly fastened to the arm, rotation about the same angle of rotation as the arm itself.

According to a second embodiment, the means of attack is formed by an acting cam and the guide is formed by a link. In this case, too, preferably the acting cam is arranged at the arm and the link is arranged to be fixed at the vehicle; the arrangement could also be vice versa, however. When the acting cam reaches the link during the pivoting movement of the arm, the acting cam is deflected e.g. perpendicularly to the pivoting plane. As the acting cam is fixedly connected to the arm, upon such deflection also the entire arm is rotated about its longitudinal axis. The angle of rotation can be easily predetermined via the shape of the link.

In the described examples, the rotation of the arm is oppositely passed through when the arm is returned from the feeding position to the parking position.

Preferably at the beginning and possibly also at the end of pivoting of the arm an idle stroke is provided in which the arm moves about its longitudinal axis without rotating. The guide then starts acting on the means of attack only beyond a predetermined angle after the beginning of the pivoting movement and/or it only acts before a predetermined angle prior to the end of the pivoting movement of the arm. Such idle stroke is preferably used for unfolding or folding the finger.

In order to facilitate catching the belt strap and to ensure safe connection between the belt presenter and the strap during the pivoting movement of the arm, a catch means for fixing the strap at the arm or at the finger can be provided at the strap and/or at the belt presenter.

The catch means can comprise, for example, a magnetic fixing between the strap and the belt presenter. For this purpose, e.g. a magnet can be arranged at the arm or at the finger and a magnetizable element e.g. in the form of interwoven magnetizable threads can be positioned in the strap. It is also possible to provide a magnet at the strap, especially at the usually provided height position fixing, and to arrange a magnetizable element at the arm or finger.

It is also imaginable to use the magnet for fixing the strap in the parking position so that the strap is in a predefined position for the next feeding movement and for reducing rattling noise.

Instead of a permanent magnet also a solenoid could be used.

Another option for realizing a catch means is to provide a catch loop at the strap. Loops at the strap are used, for example, to reduce rattling of the plug-in tongue against the vehicle lining. Such loop can be designed so that it can be seized by the finger and caught into the feeding position. The loop can be stitched onto the strap, for instance, but it can also be fastened otherwise to the strap, as a matter of course, for example by gluing.

Still another option for realizing a catch means is to provide a Velcro element, wherein one part of the Velcro fastener (for example a pile strip or a hook strip) is fixed to the arm or finger and the other part is fixed to the strap.

When using such catch means it is of advantage when the belt presenter is moved more closely to the strap by the rotation of the arm so that the two elements of the Velcro fastener can contact each other.

It is also possible that the strap also contacts the belt presenter in the parking position and the Velcro fastener is closed. In addition, this reduces rattling noise when the vehicle seat is not occupied.

BRIEF DESCRIPTION OF THE DRAWINGS

The invention will be described hereinafter in detail by way of two embodiments and with reference to the enclosed drawings, in which:

FIGS. 5 to 9 are different view of the arm of FIG. 2;

DESCRIPTION OF EMBODIMENTS

Figure 1:
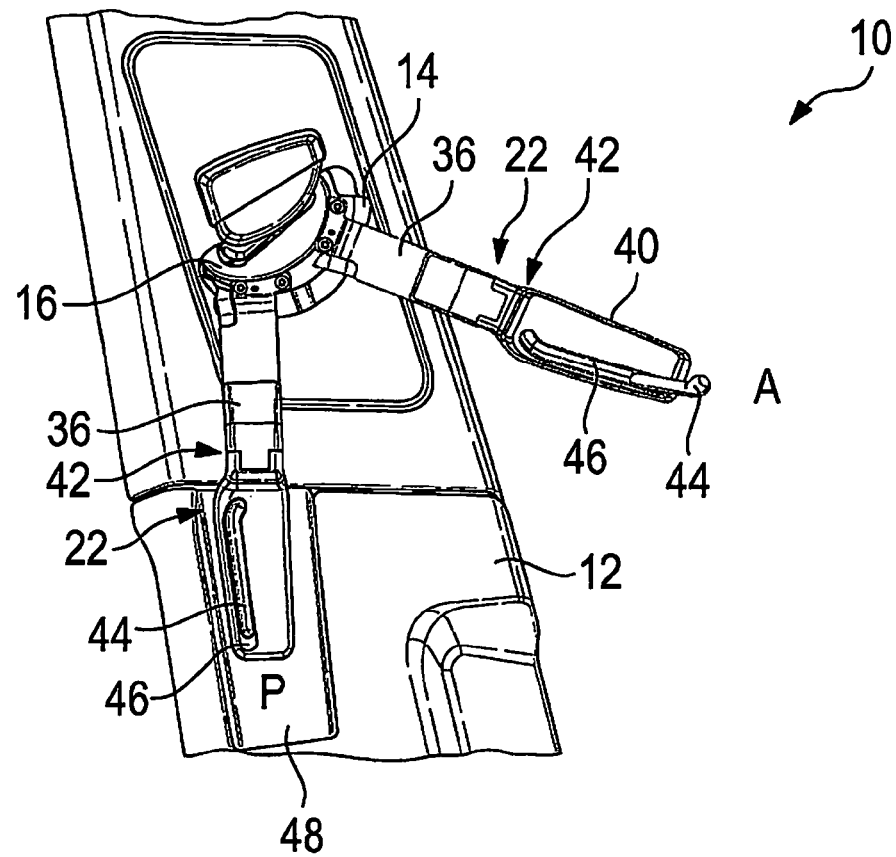
FIG. 1 shows a schematic perspective view of a belt presenter system according to the invention comprising a belt presenter according to the invention, mounted on a height adjuster at the B-pillar of a vehicle, the arm being provided in the parking position and in the feeding position.
Figure 2:
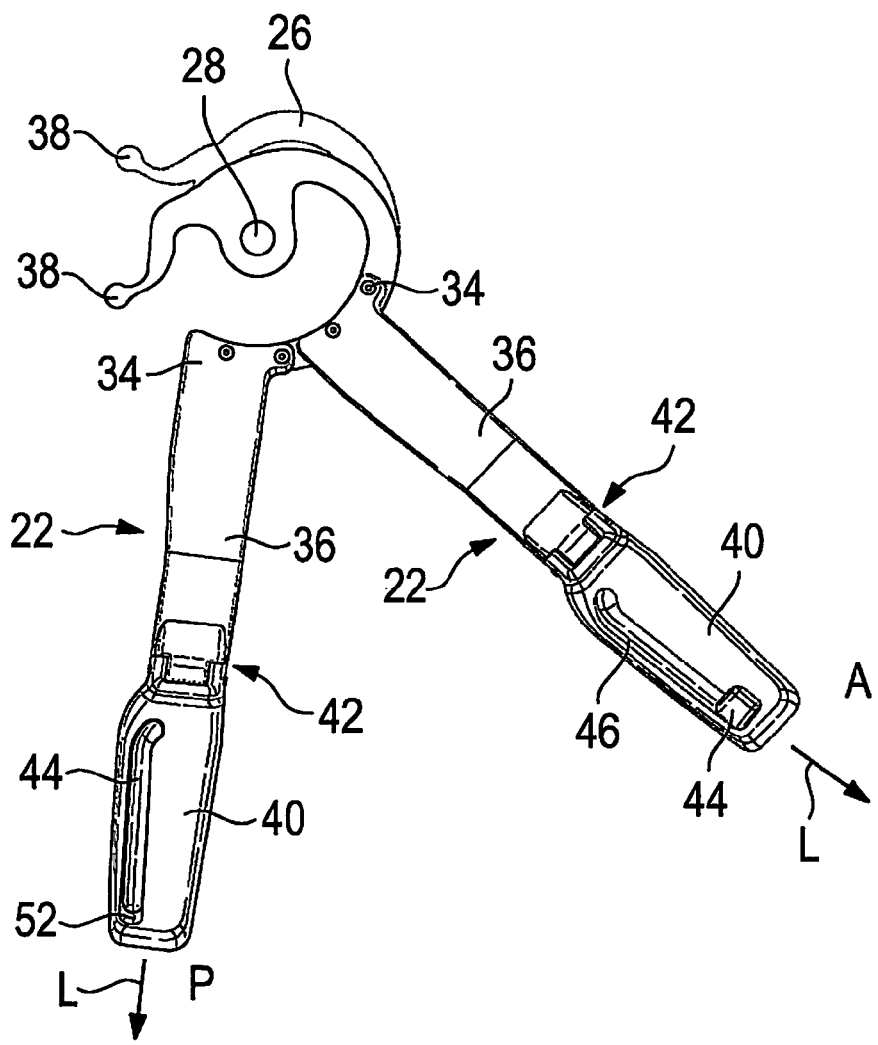
FIG. 2 shows the arm of the belt presenter of FIG. 1 both in the parking position and in the feeding position.

FIG. 1 illustrates a belt presenter system 10 in a seat belt system of a passenger car.

Figure 14:
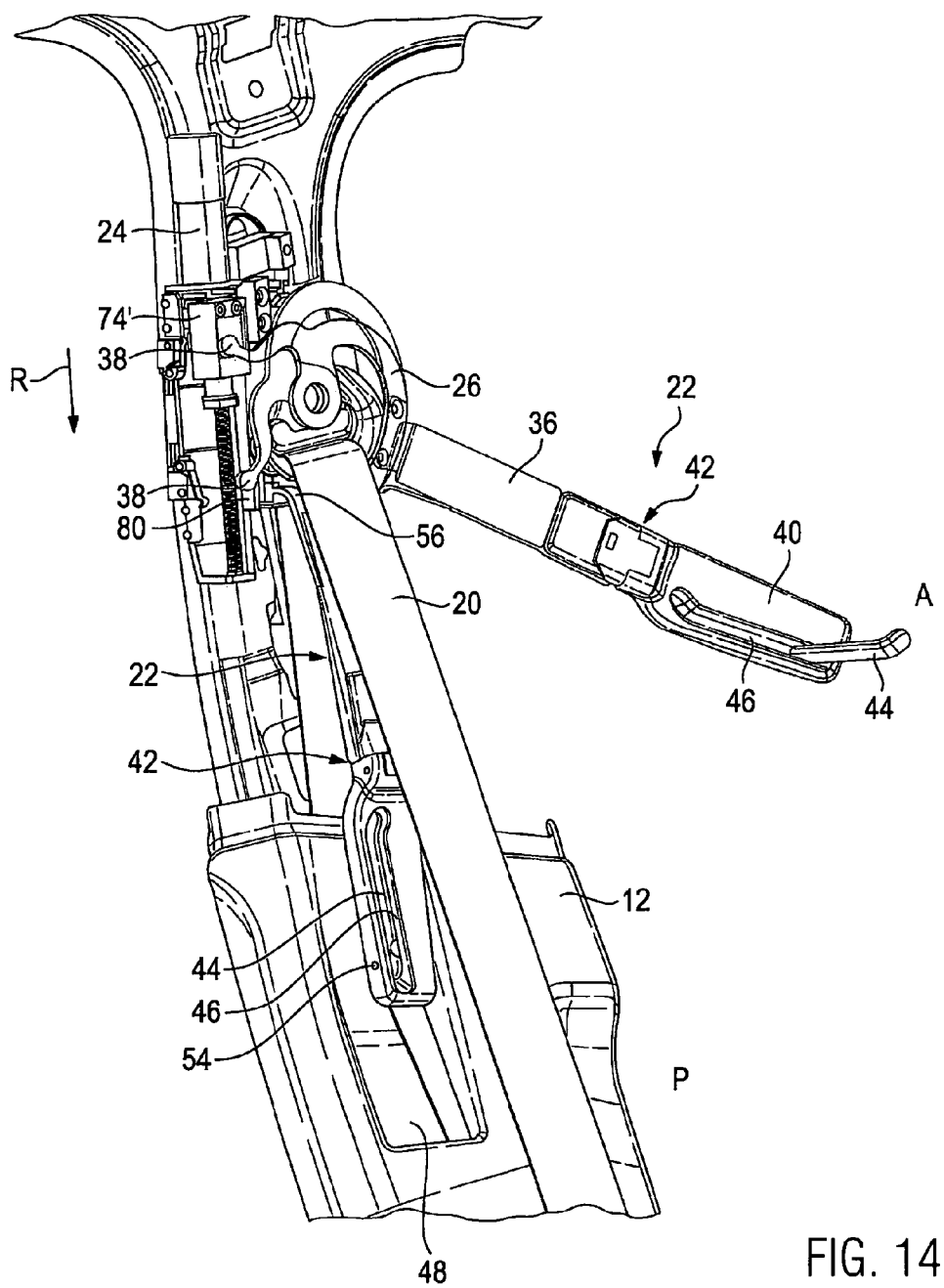
FIGS. 14 to 21 show the belt presenter system in two different positions and in different positions of the height adjuster in a second variant.

The seat belt extends from a belt retractor not shown behind a lining 12 of the B-pillar of the vehicle to an aperture 14 in the lining 12 via deflection fittings 16 fastened to a slide 18 of a height adjuster (cf. also FIG. 14). From there the strap 20 extends along the known path to a link point fixed at the vehicle.

The belt presenter, especially an arm 22 and a drive 24, in this case are equally mounted on the slide 18 of the height adjuster. The drive 24 could also be arranged at a different position in the vehicle, however. The arm 22 need not absolutely be mounted on the height adjuster, either, but can be arranged to be fixed at the vehicle on the lining of the B-pillar, for instance.

The arm 22 has a link portion 26 (clearly visible in the FIGS. 2 to 9 and 11) having a link point 28 in the form of an eyelet by which the arm 22 is rotatably fixed to the link point of the deflection fittings 16 on the slide 18.

The entire link portion 26 in this embodiment is punched out of sheet steel and is substantially even.

A washer 30 surrounds the eyelet of the link point 28 and provides freedom of movement vis-à-vis the deflection fittings 16.

The link portion 26 has a fastening portion 34 at which it is connected to a rigid arm segment 36 so that the link point 28 is located along an extension of the longitudinal direction L of the rigid arm segment 36. Between the fastening portion 34 and the link point 28 the link portion 26 is bent to be approximately C-shaped so as to provide space for the deflection fittings 16 when the arm 22 is mounted on the vehicle.

The link portion 26 moreover includes a first element of attack 38 in the form of an outwardly protruding bracket having a thickening at its free end.

Viewed from the top, an end portion 40 which is connected to the fixed arm portion 36 via a hinge 42 is located in extension of the fixed arm portion 36 in the longitudinal direction L. The hinge 42 permits pivoting of the end portion 40 out of the plane which is defined by the arm 22 and in which the latter is pivoted. The pivot axis of the end portion 40 is perpendicular to the longitudinal direction L of the arm 22. The pivoting plane of the arm 22 is located approximately in parallel to a vehicle side wall and to the surface of the lining 12 of the B-pillar.

The hinge 42 permits, in the state mounted on the vehicle, to pivot the end portion 40 into a bent position (cf. FIG. 14) in which the end portion 40 is bent vis-à-vis the fixed arm portion 36 toward the vehicle side wall and toward the lining 12 of the B-pillar. The end portion 40 is bent vis-à-vis the axis of the fixed arm portion 36 between 20° and 50°.

At the end portion 40 an unfolding finger 44 is mounted which in the parking position P is folded in and is accommodated in a recess 46 of the end portion 40 so that it does not substantially project from the contour of the end portion 40. In the feeding position A the finger 44 is provided in an unfolded position in which it projects at approximately 90° from the end portion 40 and is also aligned perpendicularly to the pivoting plane.

In the lining 12 of the B-pillar a recess 48 is formed (cf. for example FIG. 1 or FIG. 15) into which the end portion 40 protrudes in the bent position in the parking position P. The free end of the end portion 40 is completely located in the recess 48 in this case. Preferably the recess 48 is formed so that an as large part as possible of the end portion 40 is accommodated so that it does not project from the residual B-pillar lining 12.

In the parking position P the arm 22 is aligned substantially in parallel to the B-pillar and the lining 12 thereof, wherein the end portion 40 is provided in the bent position and is accommodated in the recess 48. The finger 44 is folded into the recess 46. The arm 22 of the belt presenter always adopts this parking position P when the strap 20 shall not be brought into the feeding position A for the vehicle occupant. During normal vehicle operation the arm 22 therefore is always provided in the parking position P. If the strap 20 is to be brought into the feeding position A, however, e.g. because the feeding movement was requested at the push of a button or a suitable sensor arranged in the vehicle door or at the vehicle seat, for example, has detected a vehicle occupant getting into the car, initially the end portion 40 is brought from the bent position into the normal position and then the finger 44 is unfolded into its unfolded position.

Figure 3:
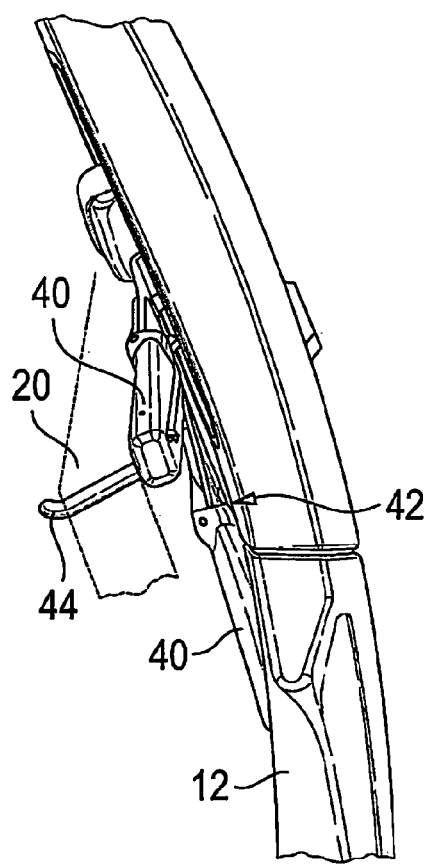
FIG. 3 shows a side view of the belt presenter system of FIG. 1.
Figure 4:
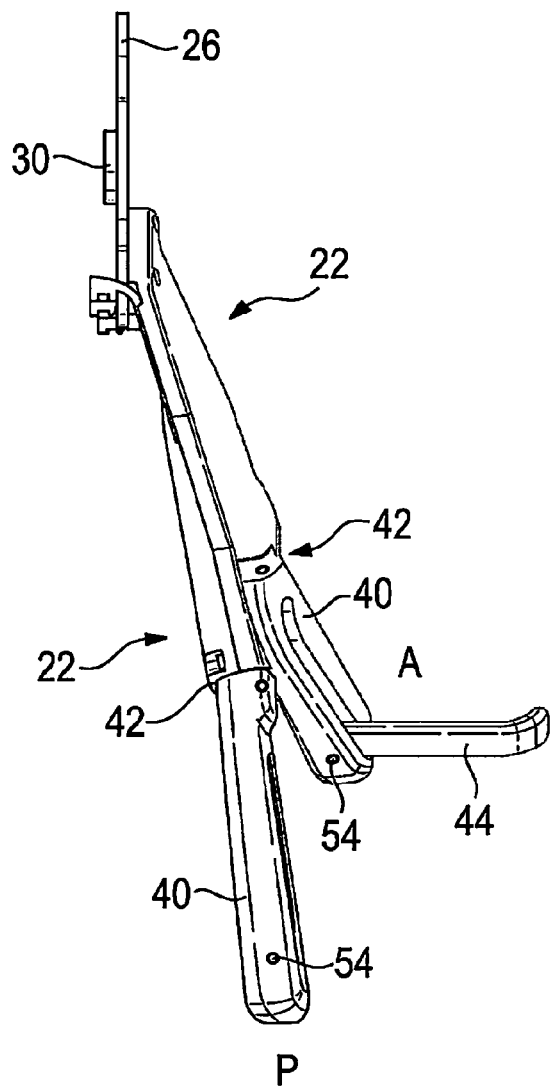
FIG. 4 shows a side view of the arm of FIG. 2.
Figure 7:
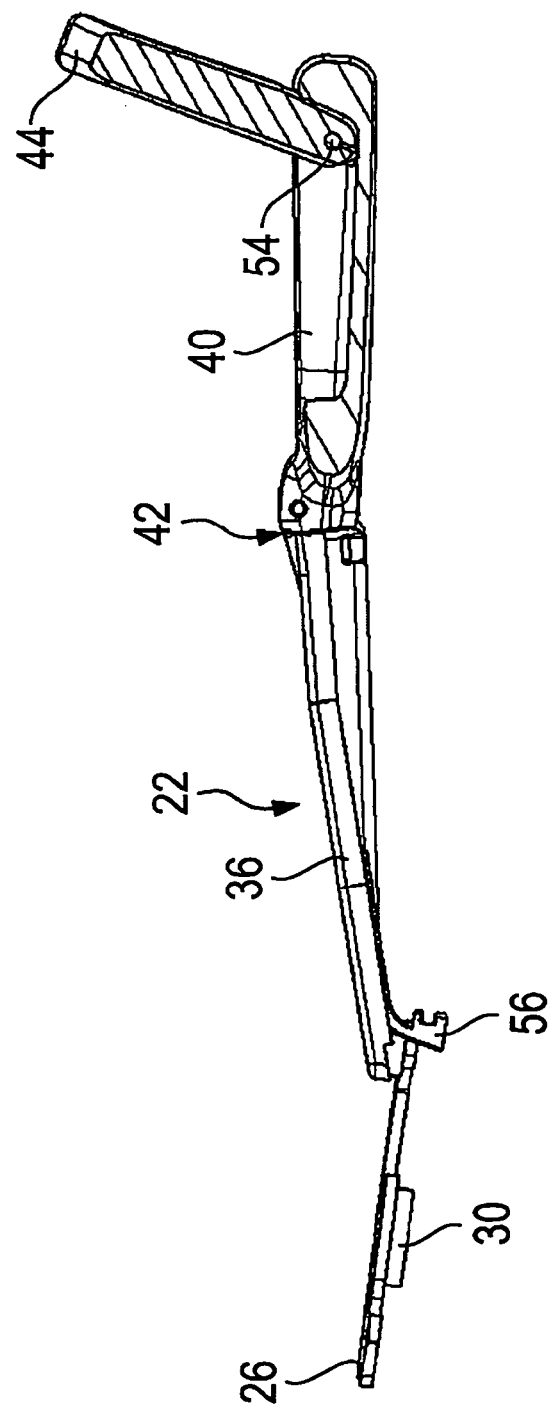

Subsequently, the entire arm 22 is pivoted about the link point 28, to the right in each of the Figures, wherein the finger 44 contacts the strap 20, which in the parking position extends over the arm 22, and catches the same, because the finger 44 is aligned approximately perpendicularly to the strap extension (cf. FIG. 3). The arm 22 is pivoted into the feeding position A (in this example approx. 65° vis-à-vis the parking position P), where the strap 20 is in a position in which it can be conveniently seized by the vehicle occupant so that the latter can fasten the seat belt.

As soon as the vehicle occupant's fastening of the seat belt has been detected (for example by detecting insertion of a plug-in tongue into the belt buckle) or else at the push of a button the arm 22 is returned to its parking position P again. When the arm 22 has reached the parking position P, at the end of the pivoting movement of the arm the finger 44 is set to the folded position and subsequently the end portion 40 is displaced to the bent position so that it is accommodated in the recess 48 again.

The movement of the arm 22, of the end portion 40 and of the finger 44 is caused by the drive 24 and an appropriate mechanism which will be described hereinafter.

Figure 8:
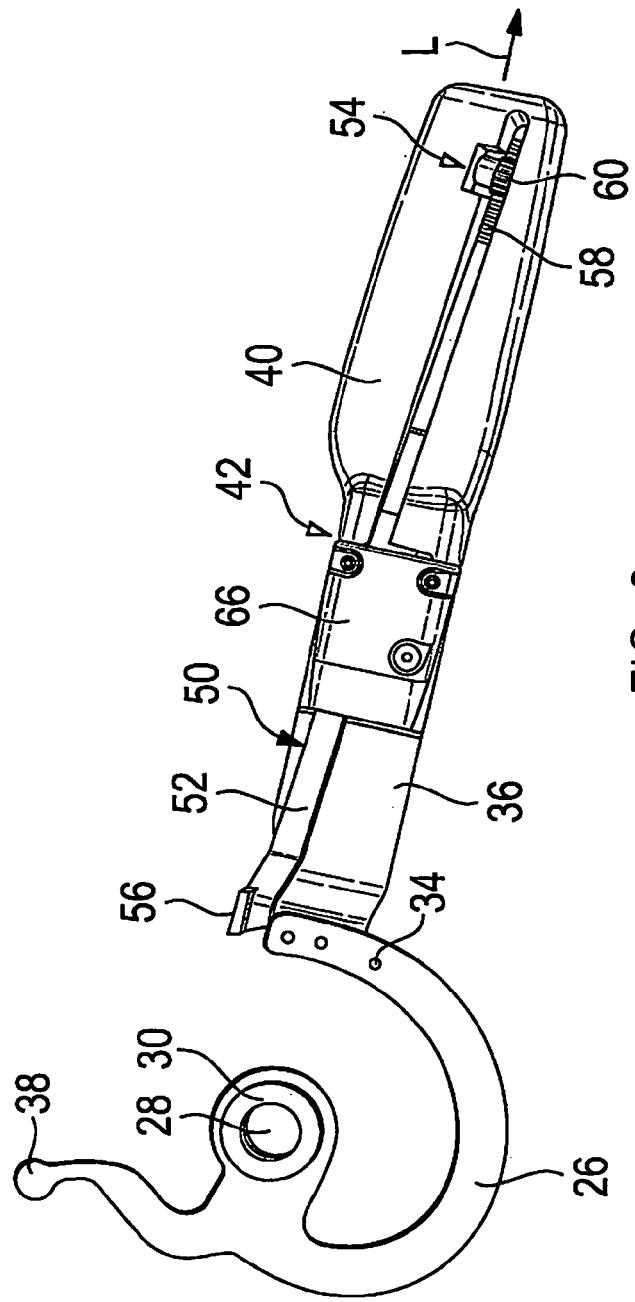
Figure 9:
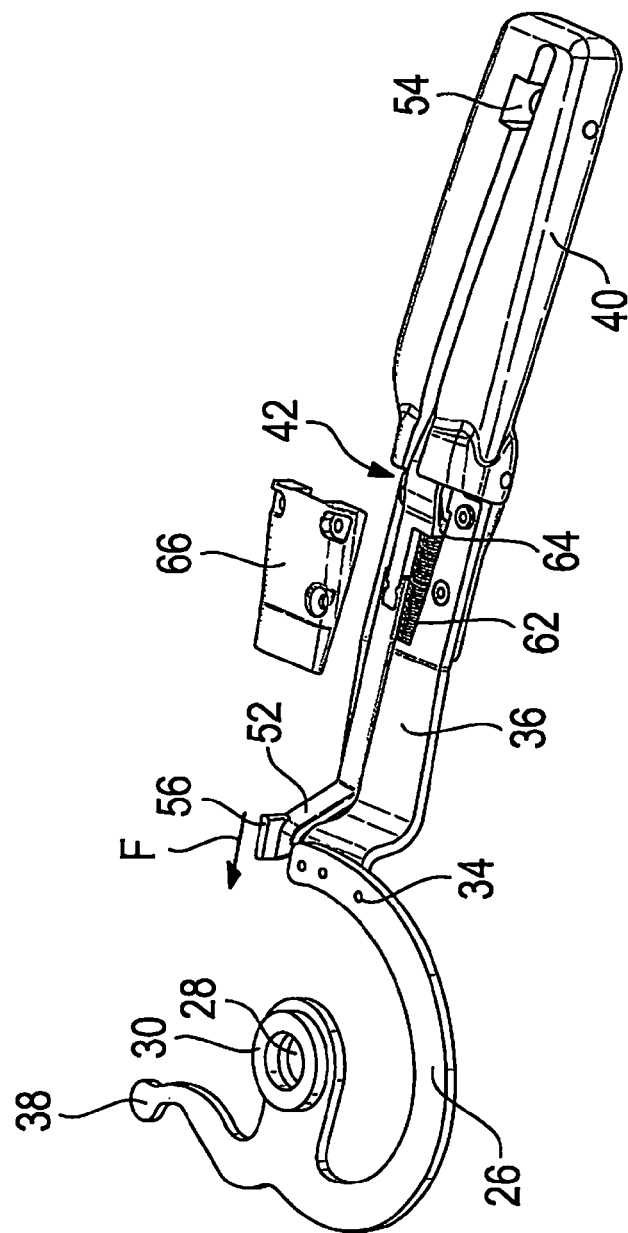
Figure 10:
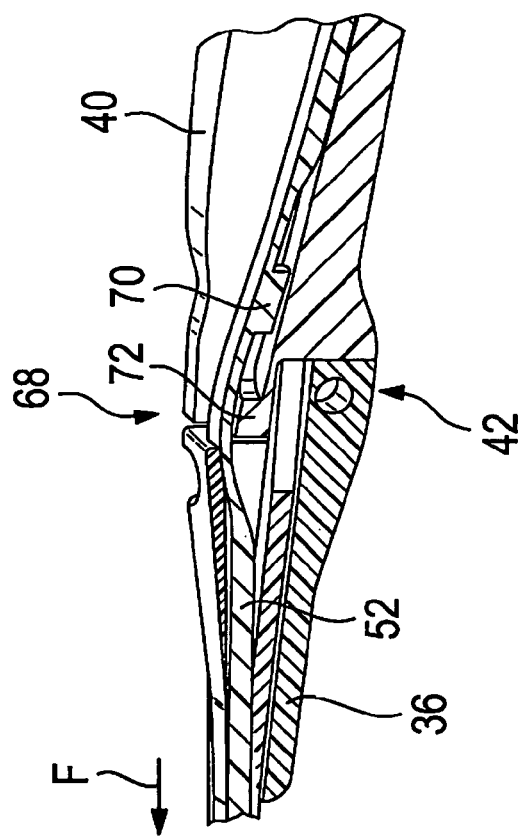
FIG. 10 shows a schematic perspective sectional view of a hinge between a fixed arm portion and an end portion of the arm illustrated in FIGS. 8 and 9.

The FIGS. 6 to 10 show a motion mechanism 50 for moving the end portion 40 and for unfolding and folding in the finger 44. The FIGS. 8 and 9 show the arm 22 from the underside, i.e. the side where the finger 44 is not arranged.

The motion mechanism 50 includes a transmission element 52 leading along the longitudinal direction L of the arm 22 from the end of the arm portion 36 connected to the height adjuster up to the link point 54 at which one end of the finger 44 is connected to the end portion of the arm.

The link point 54 of the finger is arranged closely to the free end of the end portion 40 so that in its unfolded position the finger 44 is positioned as closely as possible to the free end of the end portion 40.

At its end arranged on the side of the height adjuster the transmission element 52 includes a second element of attack 56, which is in the form of a bent end here. The transmission element 52 in this example is a flat elongated synthetic element which is also compression-rigid. At the finger-side end the transmission element 52 includes a gearing 58 engaging in a gearing 60, here in the form of a gearwheel, which is connected for co-rotation with the finger 44 and is rotatable about the link point 54 thereof. When a force F is applied to the transmission element 52 at the second element of attack 26 in a direction away from the end portion 40 along the longitudinal direction L (cf. FIG. 9), the rack-and-pinion drive 58, 60 ensures that the finger 44 folds into the recess 46.

A spring in the form of a spiral spring 62 is arranged at the fixed arm portion 36 and acts on a stop 64 in the transmission element 52, the spring force counteracting the tensile force F. The spring force of the spring 62 pushes the transmission element 52 toward the end of the end portion 40, wherein the finger 44 is moved into the unfolded position by the movement of the gearings 58, 60.

The same motion mechanism 50 also moves the end portion 40 out of the normal position into the bent position and back. This is evident from FIGS. 6 and 10. A guide 68 and a stop 70 formed in the transmission element 52 which interacts with a second stop 72 formed in the end portion 40, when the transmission element 52 has covered a predetermined distance in the direction away from the free end of the end portion 40, ensure that the arm is pulled into the bent position at the end portion 40 (upwards in FIGS. 8 to 10). The hinge 42 is configured so that a resistance is set against a further bending movement.

The spring 62 acting on the stop 64 also in this case causes the end portion 40 to be returned to the normal position when the force F acting on the transmission element 52 subsides.

Instead of the synthetic element and the meshing gearings 58, 60 for moving the finger 44 also a Bowden cable could be employed.

The motion mechanism 50 is usually covered by a cover 66.

Since the pivoting movements both of the end portion 40 into the normal position and of the finger 44 into the unfolded position are caused by the force of the spring 62, both movements are carried out very quickly so that the strap can be safely seized.

The FIGS. 11 to 21 illustrate the operating mode of the drive 24 in larger detail.

In the examples shown here the drive 24 is an electrically driven spindle drive which is mounted on the slide 18 of the height adjuster. A linearly movable drive element 74 reciprocating along a tree rod 76 when the drive 24 is active includes an acceptance 78 for the first element of attack 38 at the link portion 26. The acceptance 78 is configured so that it has certain play of several millimeters in the direction of movement of the drive element 74. Moreover, the acceptance 78 offers sufficient play perpendicularly to the direction of movement so as to be capable of compensating the lateral movement of the element of attack 38.

At the drive element 74 an extension in the form of a tie rod having an end-side stop 80 is rigidly mounted, the latter engaging in the second element of attack 56 when the arm 22 approaches the parking position P.

Figure 11:
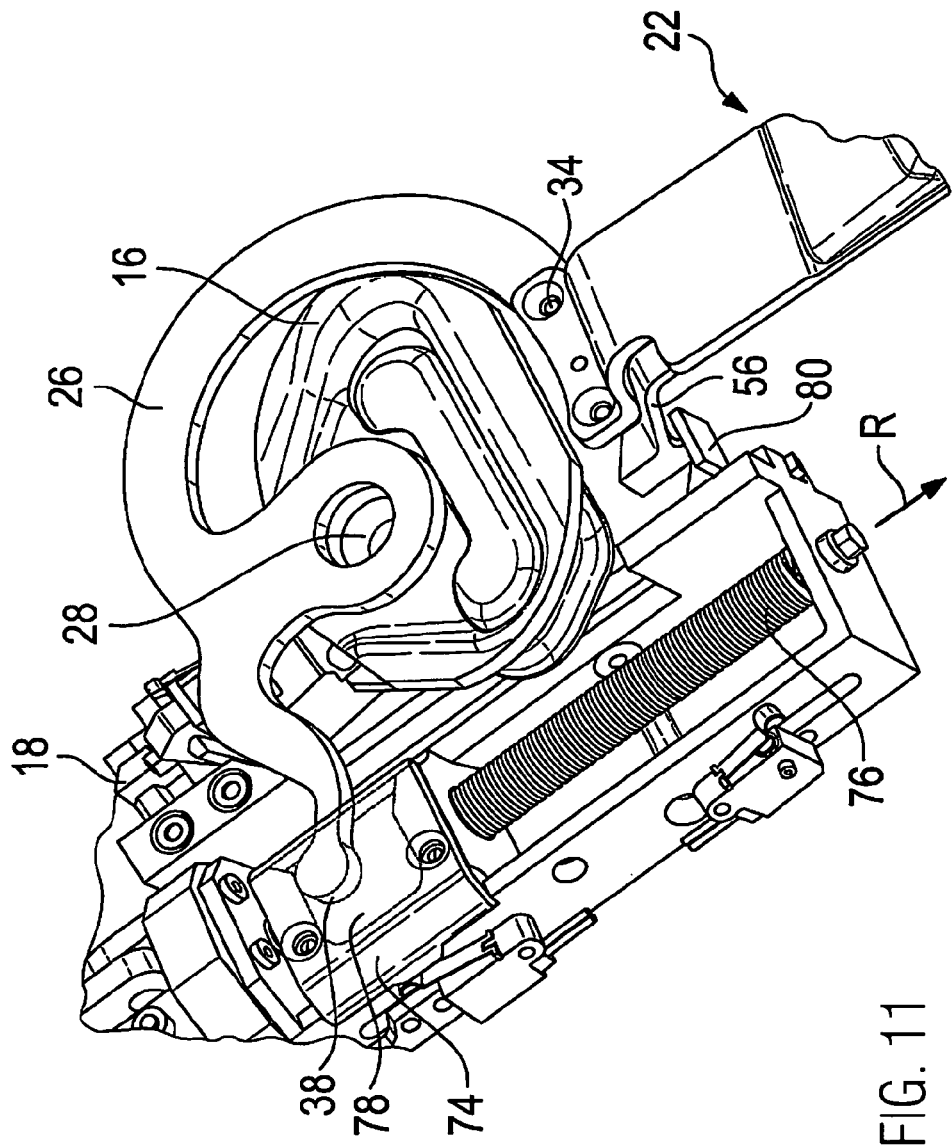
FIGS. 11 to 13 show schematic perspective representations of the interaction of a drive element with the arm of the belt presenter of FIG. 1 according to a first variant.
Figure 12:
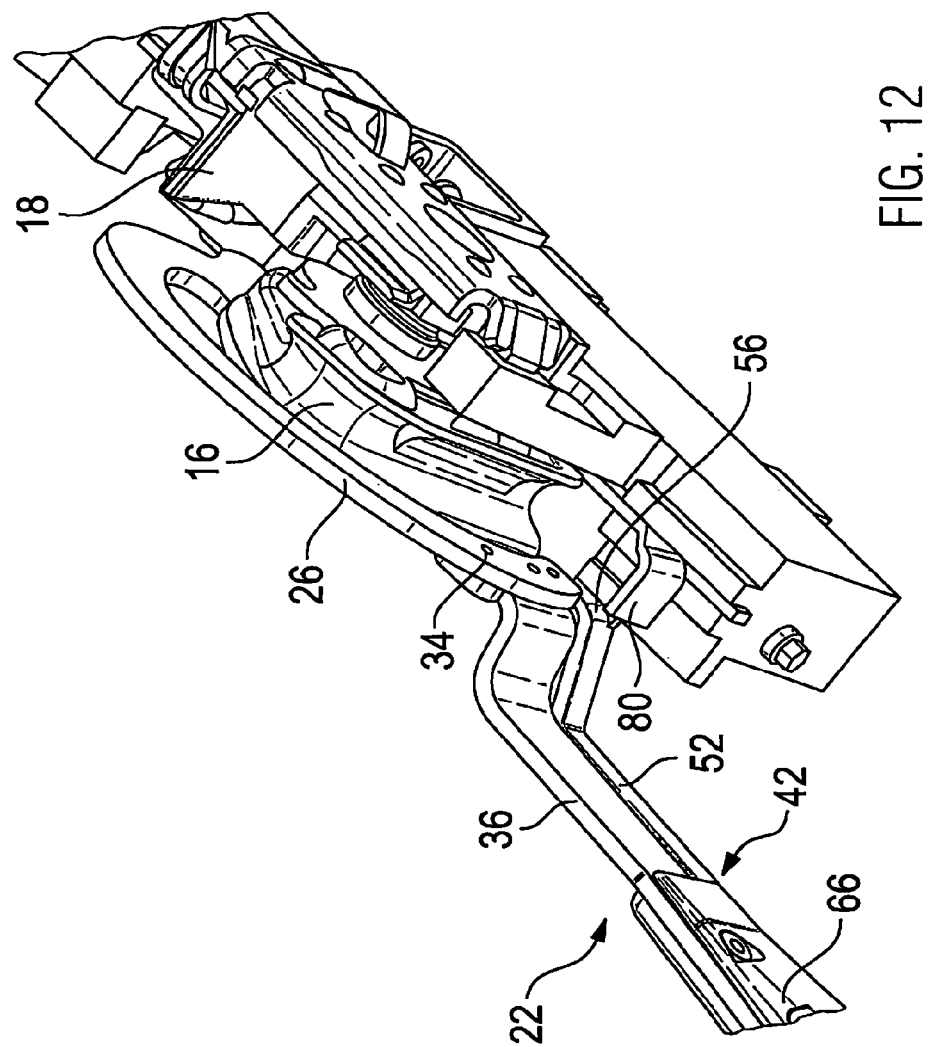
Figure 13:
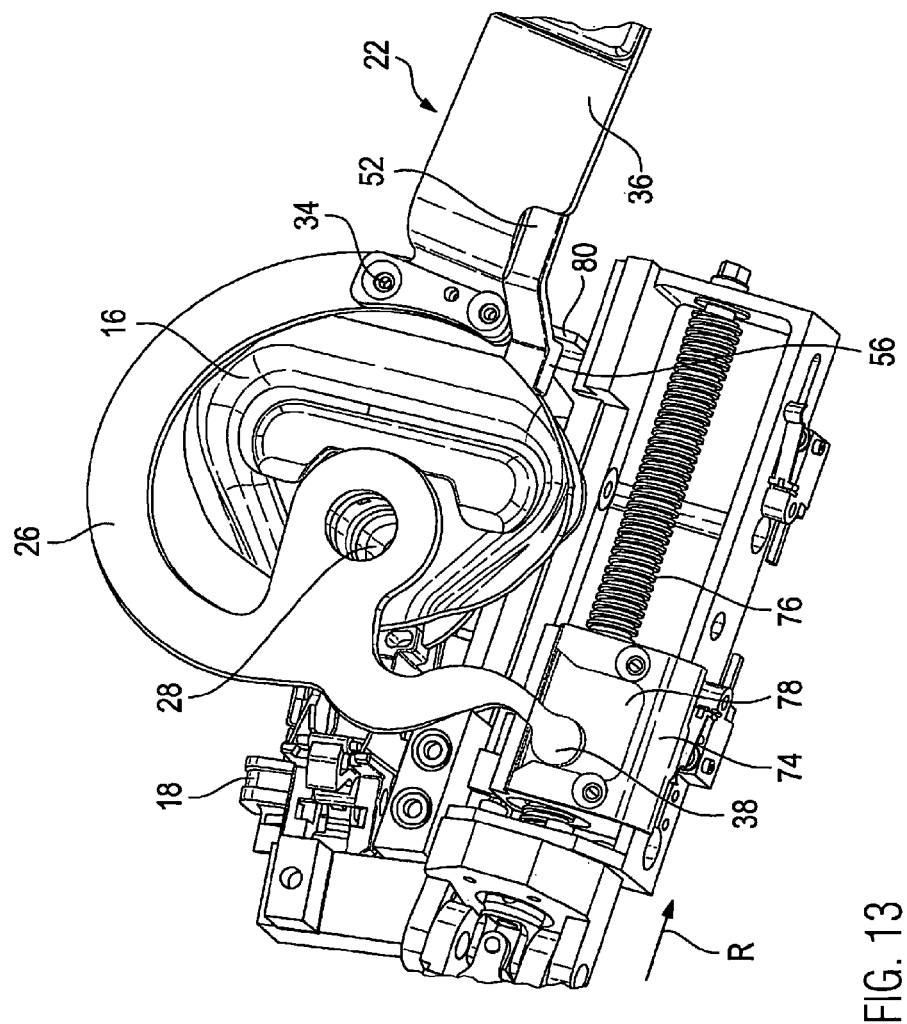

In FIG. 11 the belt presenter is shown in the parking position P. For traveling into the feeding position A the drive element 74 travels in the direction R (downwards related to the B-pillar).

By this movement the tensile force F acting via the stop 80 on the second element of attack 56 subsides so that the spring 62 starts to pivot the end portion 40 out of the bent position into the normal position and then to move the finger 44 out of the folded position into the unfolded position. At the same time, the first element of attack 38 is moved in the direction R, thereby the link portion 26 and thus the entire arm 22 being pivoted. The further traveling movement of the drive element 74 then pivots the arm 22 to the feeding position A.

During the reverse movement from the feeding position A into the parking position P the drive element 74 moves in the opposite direction. The second element of attack 56 has disengaged from the stop 80 by the pivoting movement so that only the force of the spring 62 acts on the end portion 40 and the finger 44. The end portion 40 thus remains in the normal position and the finger 44 remains in the unfolded position.

When the arm 22 has been pivoted completely into the parking position P, also the second element of attack 56 again contacts the stop 80. When moving further opposite to the direction R, the stop 80 exerts a force F on the second element of attack 56 opposite to the direction R and acts, as described before, against the force of the spring 62 via the transmission element 52 on the finger 44 which is moved via the interaction of the gearings 58, 60 into the folded position and equally acts via the interaction of the stops 70, 72 on the end portion 40 so that the latter is pulled into its bent position.

Figure 15:
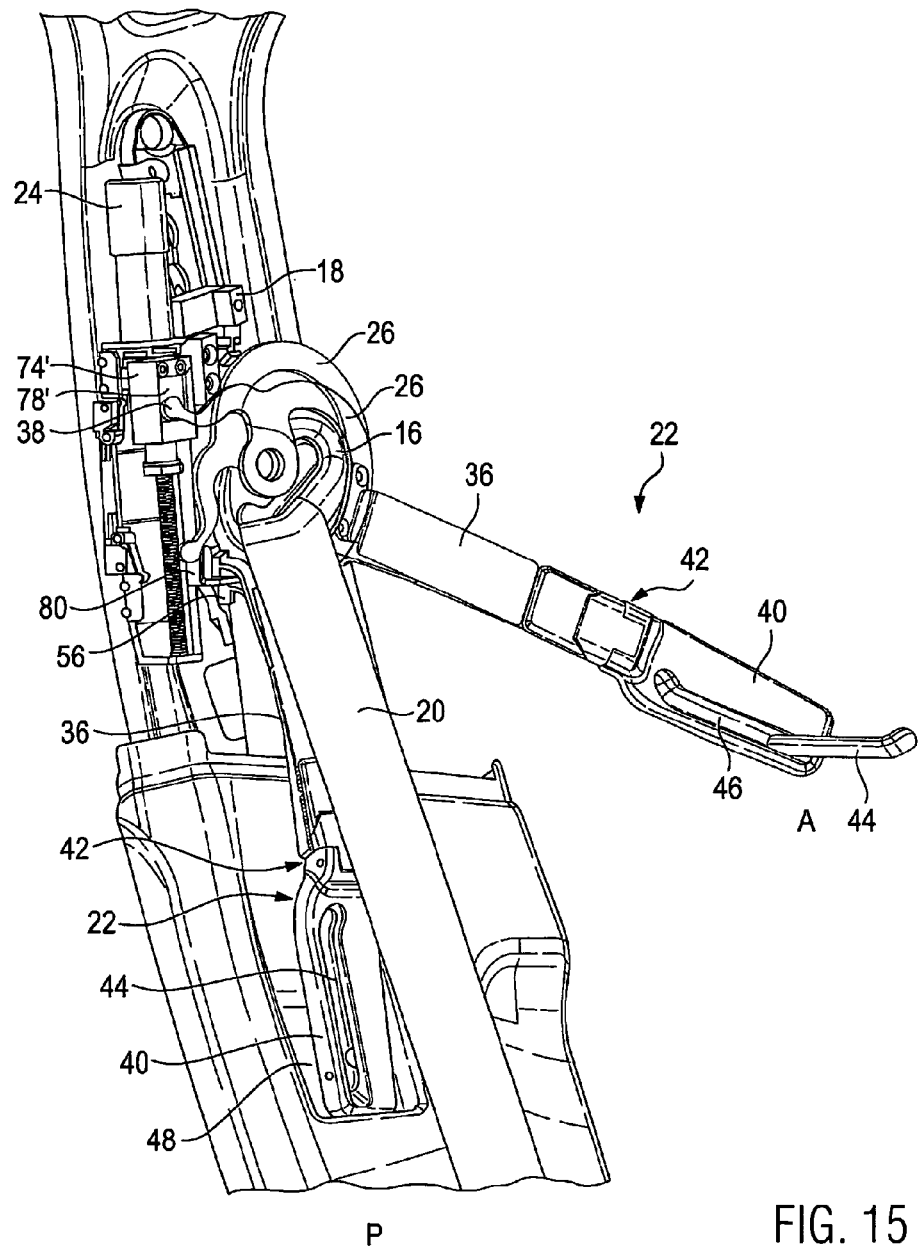
Figure 16:
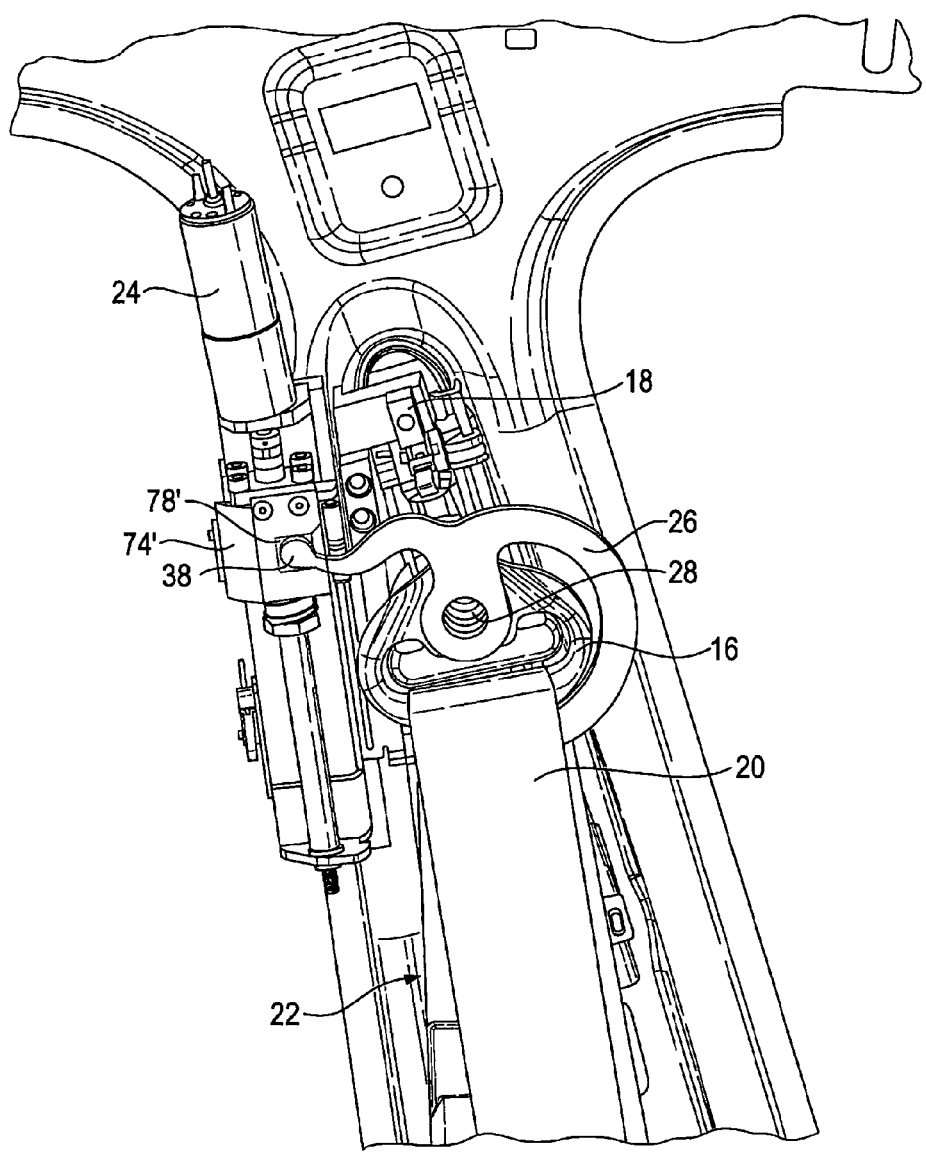
Figure 17:
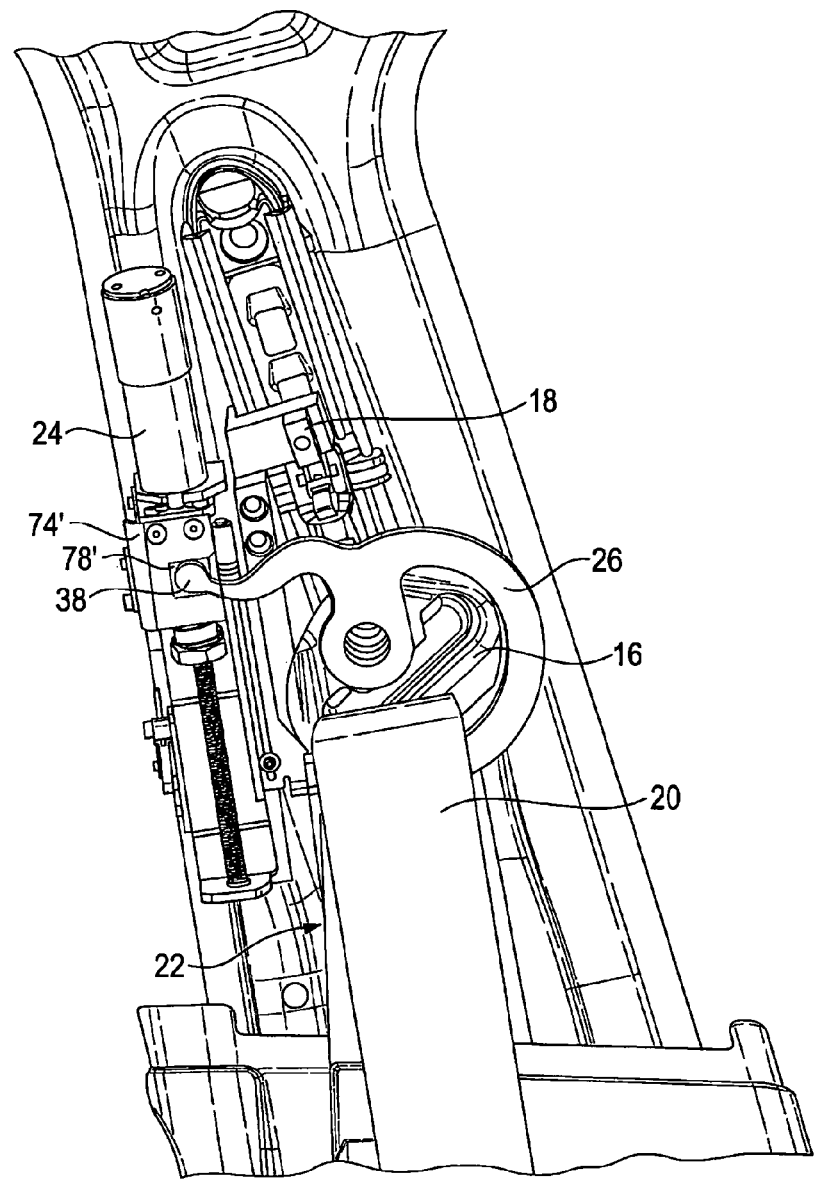
Figure 18:
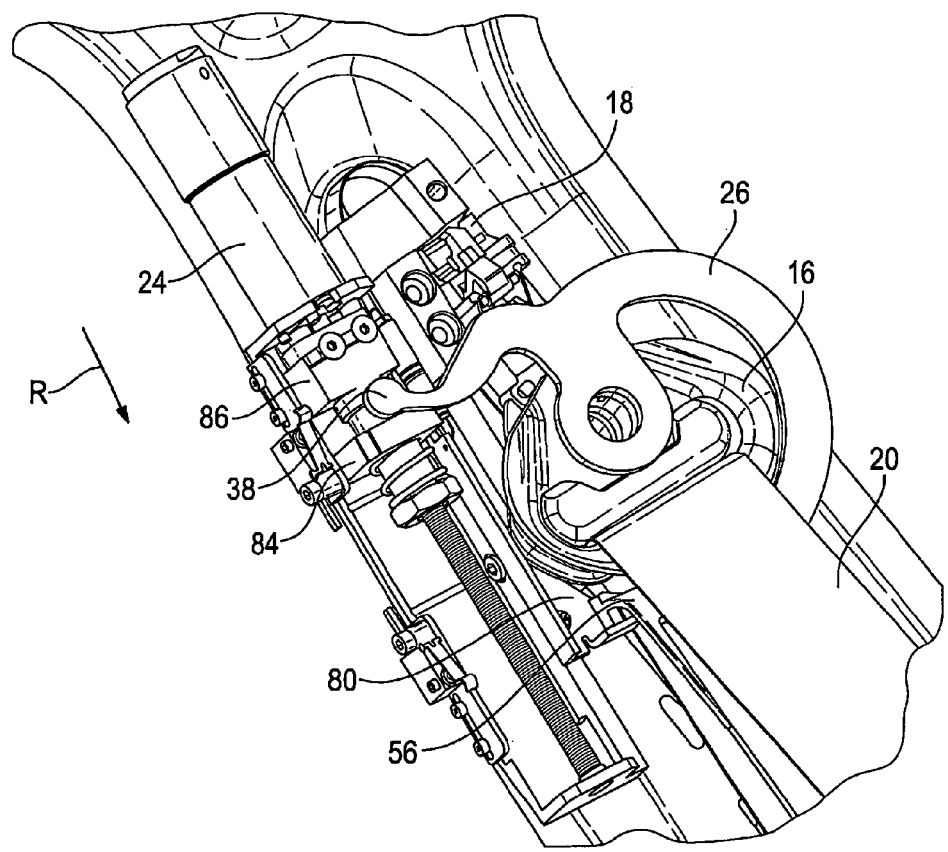
Figure 19:
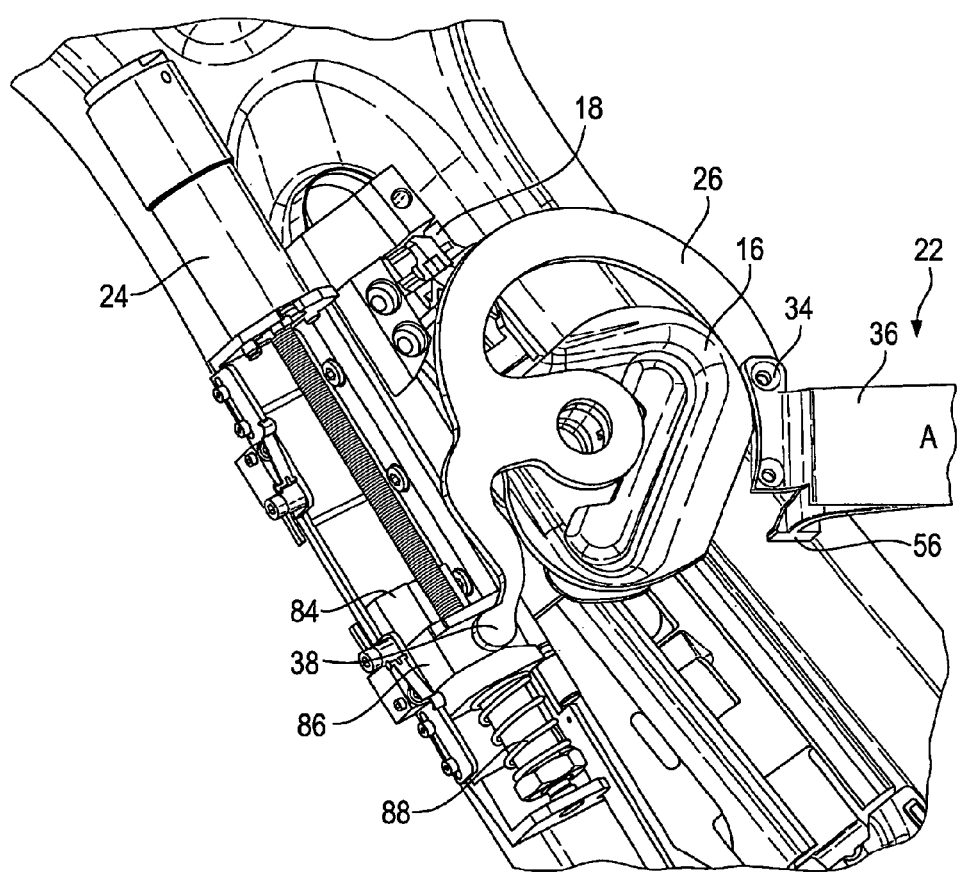
Figure 20:
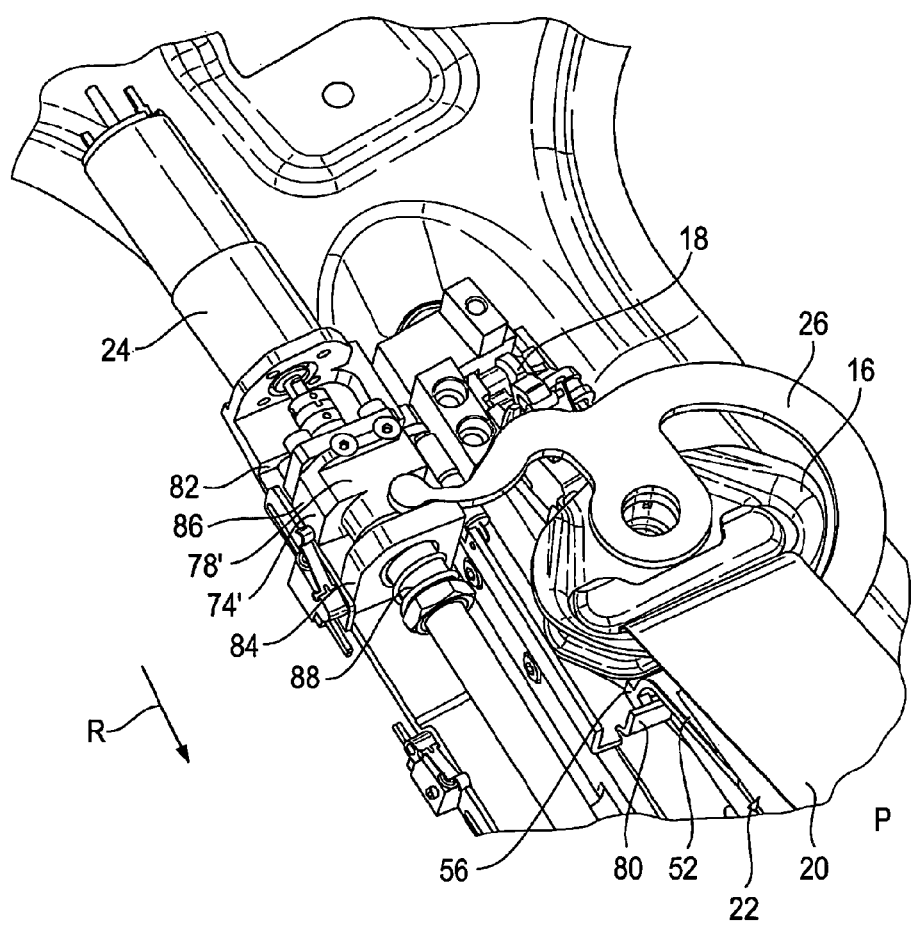
Figure 21:
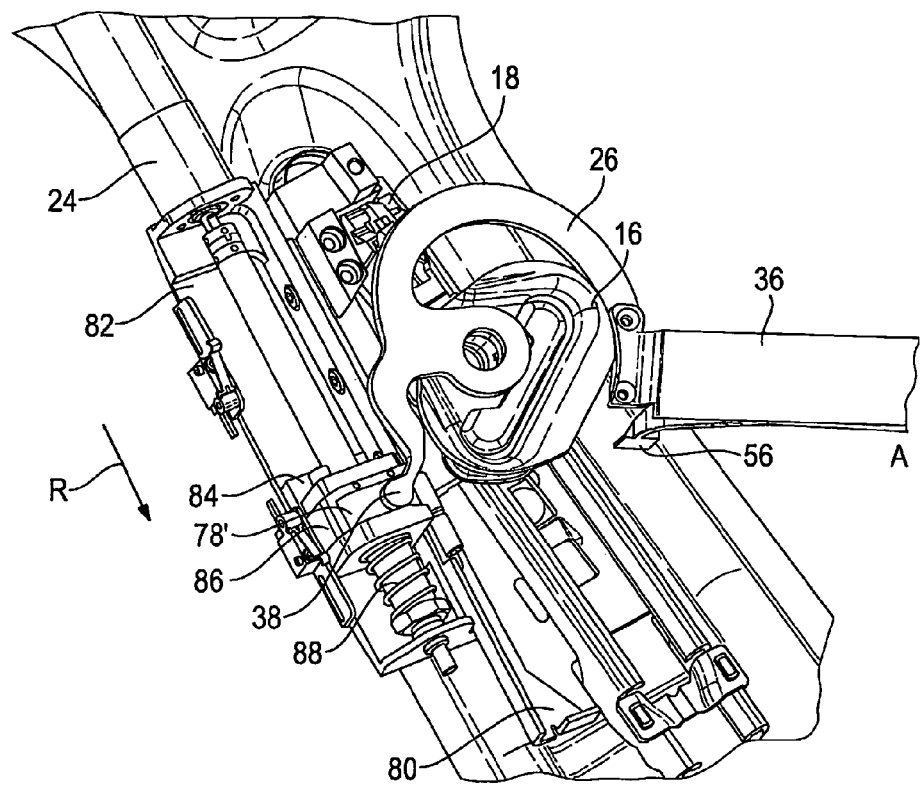
Figure 22:
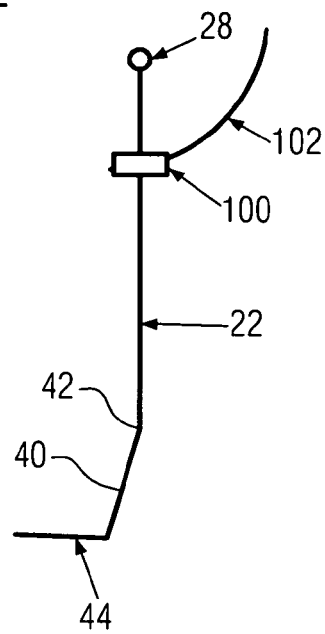
FIGS. 22 and 23 schematically show a belt presenter system according to the invention according to a further embodiment.

Since in these examples the drive 24 is mounted on the slide 18 of the height adjuster, the entire drive is moved when the height adjuster is actuated. FIG. 14 illustrates the state when the slide 18 has taken its highest position in the vehicle, while FIG. 15 illustrates the state when the slide 18 takes its lowest position in the vehicle. It has to be noted that the recess 48 in the lining 12 of the B-pillar along the B-pillar is selected to be so long that in the position of the slide 18 shown both in FIG. 14 and in FIG. 15 the end portion 40 can immerse into the recess 48.

Since the drive 24 and the entire mechanism of the belt presenter are mounted on the slide 18 of the height adjuster, the function of the belt presenter does not change with the position of the height adjuster.

Briefly summing up, in the first embodiment a transmission element counteracting a return spring is used in the arm. When the transmission element is pulled (which is the case when the system is in its home position), the end portion is folded down and the finger is folded in. When the transmission element is released (which takes place at the beginning of the pivoting movement of the arm), the return spring ensures that the end portion of the arm is outwardly adjusted (along an extension of the arm) and the finger is unfolded. Idling between the drive element 74 and the element of attack 38 ensures the course of the folding/pivoting movement correct in time of the end portion and the finger, on the one hand, and the pivoting movement of the arm, on the other hand.

The FIGS. 16 to 21 show a second variant of the afore-described mechanism. In this case the linearly moving drive element 74' of the spindle drive includes an acceptance 78' receiving the first element of attack 38 without play. The idling for separating the movement of pivoting the arm 22 and of unfolding and, resp., folding in the finger 44 and moving the end portion 40 is achieved here by a spring travel, which is shown in more detail in FIGS. 20 and 21, for example.

The drive element 74' is composed of two parts in this case, a slide element 84 and a catch element 86 moved by the threaded spindle, wherein a portion of the catch element 86 protrudes through an aperture in the slide element 84 and is loaded by a spiral spring 88 opposite to the slide element 84 so that the catch element 86 also moves the slide element 84. The acceptance 78' is formed by an upper stop in the catch element 86 and a lower stop in the slide element 84. The spring force also ensures clamping of the first element of attack 38 between the catch element 86 and the slide element 84.

During the movement out of the parking position P into the feeding position A toward the direction R downwards along the B-pillar, the arm 22 is pivoted into the feeding position A in that the drive element 74' downwards catches the first element of attack 38.

At the start of movement the second element of attack 56 is in mesh with the stop 80 of the transmission element and is loaded by the latter so strongly that the action of the spring 62 is overcome and the finger 44 is folded in and the end portion 40 is bent. Initially the catch element 86 moves vis-à-vis the slide element 84, wherein the transmission element tightly connected to the catch element 86 and thus the stop 80 are traveled in the direction R. Thus the tensile force acting on the second element of attack 56 subsides so that due to the spring action of the spring 62 the finger 44 is brought into the unfolded position and the end portion 40 is brought into the normal position.

When the idling formed by the spring travel between the catch element 86 and the slide element 84 has been passed through and the catch element 86 contacts the first element of attack 38, the latter is caught by the drive element 74" in the direction R. Thus the arm 22 starts pivoting, whereby the mesh between the stop 80 and the second element of attack 56 is disengaged. Due to the spring action of the spring 62 the finger 44 remains unfolded and the end portion 40 is maintained in the normal position (not shown in FIG. 21).

Upon returning to the parking position P (FIG. 20) the second element of attack 56 contacts the stop 80 as soon as the arm 22 has reached the parking position. Upon the return movement to the parking position P the first element of attack 38 is moved by the slide element 84. The slide element 84 reaches an upper stop 82 which blocks further movement thereof against the direction R. As the catch element 86 connected to the thread continues to be moved against the direction R, however, it is moved away from the aperture in the slide element 84 against the force of the spring 88. In so doing, the first element of attack 38 is not further moved, however, so that the arm is not further pivoted, either.

However, the stop 80 which is tightly connected to the catch element 86 is moving; therefore tension is exerted on the transmission element 52 via the second element of attack 56. This tension causes the finger 44 to be moved into the folded position and the end portion 40 to be traveled into the bent position.

Upon reaching the parking position P and folding the finger 44, the strap 20 is released again. The belt presenter is only in contact with the strap 20 when the belt is moved into the feeding position A. Otherwise the strap 20 is not in contact with the belt presenter.

The arm 22 in this case exhibits a particular curvature above approx. 10 to 20° by which it adapts to the course of the B-pillar lining 12. For a simplified description, however, a straight arm is assumed here.

The mechanism for moving the finger 44, the end portion 40 as well as the arm 22 is exemplified here; any other suitable mechanism comprising a directly engaging drive 24 or drive acting via interconnected actuators is imaginable, too.

For example, the drive could also be realized by elements made of shape-memory alloys and the change of shape thereof.

Figure 23:
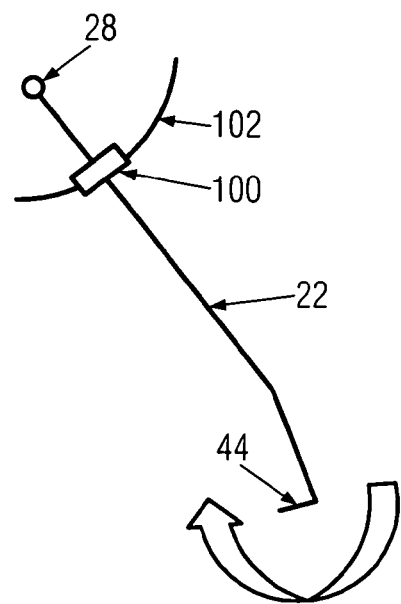
Figure 24:
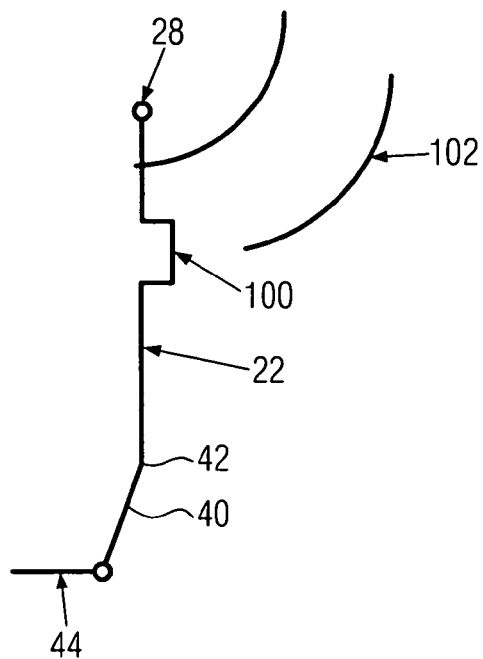
FIGS. 24 and 25 schematically show a belt presenter system according to still another embodiment.

In FIGS. 23 and 24 another embodiment of a belt presenter system is represented.

In this case a mechanism is provided which permits to rotate the arm 22 of the belt presenter during the pivoting movement out of the parking position P into the feeding position A about its longitudinal axis. By such rotation the finger 44 changes its orientation in the vehicle interior and is pivoted, especially after having seized the strap 20, in the direction of the vehicle side wall (cf. FIG. 23). As a consequence, the finger 44 and the entire arm 22 are moving in the vehicle interior during the feeding movement so that disturbance of the vehicle occupant can be largely avoided.

By the rotation of the arm 22 even more space can be obtained when the curvature of the arm 22 along the longitudinal extension thereof is selected in a suitable manner.

In the embodiment shown here the mechanism is formed by a means of attack 100 interacting with a guide 102. The means of attack is realized by a gearwheel arranged concentrically about the arm 22, while the guide 102 is formed by a segment gear in the form of a rack following a circular section.

Upon pivoting the arm 22, after a predetermined first pivoting angle (not shown here) the gearwheel engages in the segment gear. The idle stroke up to this point in time can be used for folding out the finger 44, for example.

Due to the advancing pivoting movement of the arm 22 the gearwheel rolls off the segment gear and the arm 23 rotates about its longitudinal axis, wherein the finger 44 is pivoted in a plane substantially perpendicularly to the longitudinal direction L of the arm 22.

Toward the end of the pivoting movement of the arm 22 a further idle stroke can be provided.

The movement of the finger 44 and the end portion 40 as well as the pivoting movement of the arm 22 in general can be performed in this embodiment just as in the afore-described embodiment.

Figure 25:
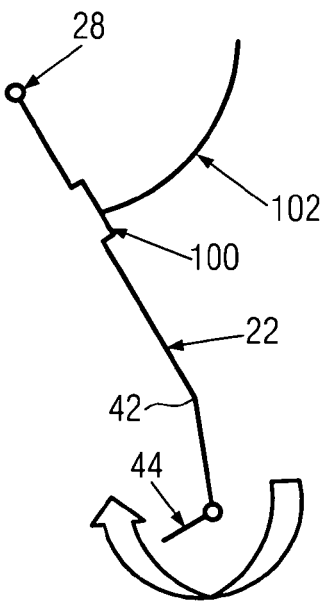

The FIGS. 24 and 25 show an embodiment in which the means of attack 100 and the guide 102 are formed by an acting cam disposed at the arm 22 as well as a link guide arranged to be fixed at the vehicle. When the acting cam contacts the link, it is pivoted (into the image plane in the Figures) and the arm 22 rotates. The pivot angle of the arm 22 about its longitudinal axis can be exactly set by the shape of the link.

In the two embodiments shown here the rotation of the arm 22 is predefined by the interaction of the means of attack 100 and the guide 102 at any point in time of pivoting the arm 22 and is inversely performed upon return from the feeding position A into the parking position P.

In order to fix the strap 20 at the belt presenter during the feeding position, a catch means (not shown) can be provided. For example, magnetic elements can be arranged at the belt presenter, especially at the arm 22 and/or the finger 44 and the strap 20. It is also possible to provide a catch loop into which the finger 44 engages at the strap. Also, it is imaginable to provide Velcro elements at the belt presenter and at the strap 20 which engage when the arm 23 contacts the strap 20.

The afore-described embodiments are also helpful in using the fixing members of the catch means as the finger 44 is pivoted actively toward the strap 20.

The described embodiments are adapted, by a suitable combination of the afore-described elements, to realize substantially any feeding movement.

The invention claimed is:

1. A belt presenter for a seat belt system of a vehicle, comprising an arm (22) mounted to a pillar of the vehicle and being pivotal in the mounted state, wherein the arm (22) can adopt a feeding position (A) and a parking position (P), and wherein the arm (22) comprises a finger (44) for seizing the strap (20) when the arm moves into the feeding position (A) and the finger (44) is pivoted to the arm (22) so that it can adopt a folded position in which it is located substantially in parallel to the arm (22) and an unfolded position in which the finger (44) is orientated substantially perpendicularly to a pivoting plane of the arm (22) and protruding into the vehicle interior.

2. The belt presenter according to claim 1, wherein the belt presenter is fastened to a height adjuster for the seat belt mounted on the vehicle pillar.

3. The belt presenter system according to claim 1, wherein in the parking position (P) the finger (44) is provided in the folded position.

4. The belt presenter according to claim 1, wherein in the feeding position (A) the finger (44) is provided in the unfolded position.

5. The belt presenter according claim 1, wherein the arm (22) includes a link portion (26) which is fastened to the height adjuster in the state mounted on the vehicle.

6. The belt presenter according to claim 5, wherein at the link portion (26) a first element of attack (38) is provided which is communicated with a drive (24) of the belt presenter and is movable by the same.

7. The belt presenter according to claim 1, wherein at the arm (22) a motion mechanism (50) for moving the finger (44) is provided which includes a second element of attack (56) that is communicated with a drive (24) of the belt presenter and can be actuated by the same.

8. The belt presenter according to claim 7, wherein the motion mechanism (50) includes a transmission element (52) having a gearing (58) which is in mesh with a gearing (60) at the finger (44).

9. The belt presenter according to claim 6, wherein the drive (24) includes a linearly movable drive element (74; 74') which upon movement of the arm (22) and/or of the finger (44) is in mesh with the first and/or second element of attack (38, 56).

10. The belt presenter according to claim 9, wherein the drive element (74; 74') is formed so that idling is provided between the movement of the second and the first elements of attack (56, 38).

11. The belt presenter according to claim 1, wherein an end portion (40) of the arm (22) is connected to the residual arm (22) via a hinge (42) so that the end portion (40) can be pivoted vis-à-vis the residual arm (22) perpendicularly to the longitudinal extension (L) and perpendicularly to the pivoting plane of the arm (22).

12. The belt presenter according to claim 1, wherein a mechanism is provided for rotating the arm (22) during the pivoting movement about the longitudinal axis thereof.

13. The belt presenter according to claim 12, wherein a means of attack (100) and a guide (102) are provided, wherein the arm (22) is rotated by the guide (102) acting on the means of attack (100) during the pivoting movement of the arm (22).

14. The belt presenter according to claim 13, wherein the means of attack (100) and the guide (102) are formed by a gearwheel and a segment gear being in mesh with the gearwheel.

15. The belt presenter according to claim 13, wherein the means of attack (100) and the guide (102) are formed by an acting cam and a guide link.

16. The belt presenter according to claim 13, wherein the guide (102) acts on the means of attack (100) only beyond a predetermined angle after the beginning of the pivoting movement and/or only before a predetermined angle prior to the end of the pivoting movement.

17. The belt presenter according to claim 1, wherein at the strap (20) and/or at the belt presenter a catch means is provided for fixing the strap (20) at the arm (22) or at the finger (44).

18. The belt presenter according to claim 17, wherein the catch means comprises magnetic fixing between the strap (20) and the belt presenter.

19. The belt presenter according to claim 17, wherein the catch means comprises a catch loop at the strap (20).

20. The belt presenter according to claim 17, wherein the catch means comprises a pile strip or hook strip.

* * * * *